United States Patent Office 3,317,560
Patented May 2, 1967

3,317,560
INDOL-3-YL ALKYLGUANIDINE DERIVATIVES
Volkert Claassen, Van Houtenlaan, Weesp, Netherlands, assignor to North American Philips Company, Inc., New York, N.Y., a corporation of Delaware
No Drawing. Filed Apr. 26, 1965, Ser. No. 451,034
Claims priority, application Netherlands, Jan. 3, 1963, 287,416; Apr. 25, 1964, 6,404,604
18 Claims. (Cl. 260—326.15)

This application is a continuation-in-part of my copending United States patent application, Ser. No. 335,368, filed Jan. 2, 1964, and now abandoned.

This invention relates to new and novel indolylalkylguanidines and to the methods of preparing these novel compounds.

A principal object of my invention is to prepare new and novel compounds of the indolylalkylguanidine series as well as the pharmaceutically acceptable acid addition salts thereof.

This and other aspects of my invention will be apparent from the description that follows:

According to my invention I have prepared new and novel indolylalkylguanidines corresponding to the formulae:

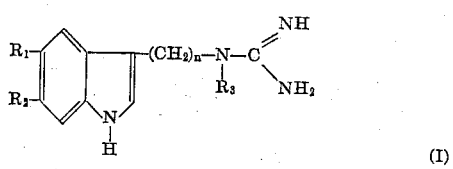

wherein $n$ is an integer of 1 to 2, $R_1$ and $R_2$ are each selected from the group consisting of hydrogen, hydroxy and alkoxy of 1 to 5 carbon atoms and in addition benzyloxy when $n$ is 1 and $R_3$ is alkyl of 1 to 5 carbon atoms and

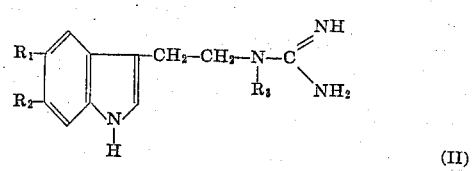

wherein $R_1$ and $R_2$ are each selected from the group consisting of hydrogen, hydroxy, alkoxy of 1–10 carbon atoms and aralkoxy of 7–10 carbon atoms, $R_3$ is selected from the group consisting of alkyl of 1–10 carbon atoms, aralkyl of 7–10 carbon atoms, aralkyl of 7–10 carbon atoms substituted with from 1 to 2 alkoxy groups of 1–3 carbon atoms and at least one of the groups designated by $R_1$–$R_3$ containing at least 6 carbon atoms.

I have found that my compounds of these formulae as well as their pharmaceutically acceptable acid-addition salts have useful pharmaceutical properties.

Thus the compounds of Formula I show hypotensive activities accompanied by a very low toxicity and extremely few side effects.

The toxicity of these compounds are so low that they are particularly useful in pharmaceutical preparations for treatment of hypertension.

This hypotensive effect of the compounds according to the invention of Formula I is the more surprising as similar tests with the known compound of the formula

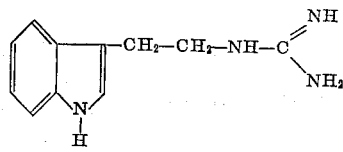

(Beilstein 22, II, 348) proved to result in hypertension.

Compared with other known guanidine derivatives having a hypotensive effect, for example the known guanidine of the formula

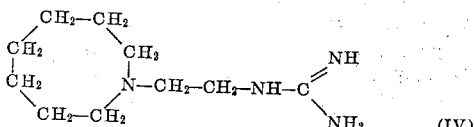

the compounds according to the invention have the advantage that there is no or substantially no rise in blood pressure immediately after the administration of the novel pharmaceuticum prior to the drop in blood pressure.

It has furthermore been found that with the administration of these novel compounds to test animals no irregularities in the electrocardiogram of these animals were found.

Particularly those compounds of the Formula I and salts thereof, in which $R_2$ is hydrogen, $R_1$ is a methoxy- or a hydroxy-group, $n=2$ and $R_3$ is an ethyl-group, have a strong hypotensive effect.

The most favorable combination of properties is found in the compound of the formula

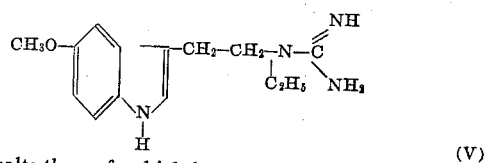

and the salts thereof, which has a satisfactory hypotensive effect without a rise in blood pressure prior to this effect, with a slight bradycardia and with low toxicity. Particularly the salts of this compound have a very satisfactory chemical stability.

The compounds of my invention of Formula II as well as the salts of these compounds exhibit strong spasmolytic and central depressive activities as well as dilating effects on the coronary vessels.

In pharmacological experiments these spasmolytic activity of my novel compounds of Formula II were determined in normal manner on the isolated guinea pig ileum with respect to papaverine, both $BaCl_2$ and carbaminoyl-chloride being used as a spasmogen.

In particular those compounds of Formula II have been found to have a high spasmolytic activity in which $R_1$ and $R_2$ represents an alkoxy group having 6–10 carbon atoms. It has been found, for example, that the compound of the formula

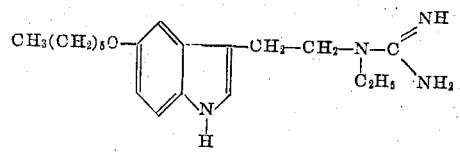

has a 7.5 times as strong activity with respect to $BaCl_2$ and 24 times as strong activity with respect to carbaminoyl chloride as papaverine.

The strongest spasmolytic activity was found in compounds of Formula II in which both $R_1$ or $R_2$ and $R_3$ is a group having at least 6 carbon atoms. For example, for the compound of the formula:

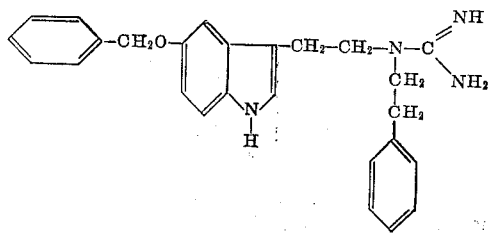

there was found a 19 times as strong activity with respect to BaCl₂ and a 27 times as strong activity with respect to carbaminoylchloride as of papaverine.

Other particularly useful compounds of Formula II are, for example:

1-ethyl-1-[2'-(5''-octyloxyindole-3''-yl)-ethyl] guanidine
1-octyl-1-[2'-(5''-benzyloxyindole-3''-yl)-ethyl] guanidine
1 phenyl ethyl-1-[2'-(6''-hexyloxyindole-3''-yl)-ethyl] guanidine
1-benzyl-1-[2'-(5''-octyloxyindole-3''-yl)-ethyl] guanidine
and salts of these compounds.

As the pharmaceutically acceptable acid addition salts of the compounds of my invention the salts of many organic and inorganic acids may be employed including those of hydrochloric, nitric, sulfuric, phosphoric, sulfamic, acetic, tartaric, citric, ascorbic, benzoic, p-aminobenzoic, mandelic and salicylic acids.

The compounds according to the invention can be produced by methods known for the production of analogous types of compounds.

Reference is made in this respect to Houben-Weyl "Methoden der organischen Chemie," 4th Edition, vol. VIII, pages 182–189.

For the production of the compounds according to the invention particularly those methods are important in which into the amine of the formula

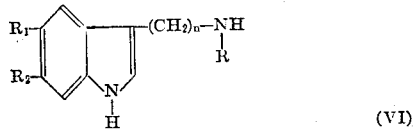

at the exocyclic nitrogen atom is introduced the amidine group

by the reaction of the amine or a salt thereof with cyanamide or a reactive derivative of the cyanamide of the formula

or a salt thereof, in which X is a radical which can be readily replaced by the amino group. Such radicals X are, for example, —O-alkyl— or —S-alkyl— radicals, preferably methoxy-, ethoxy-, methylthio- or ethylthio groups or an HO₂S-group. Other readily replaceable groups X are: heterocyclic groups having at least two nitrogen atoms in the ring, one atom of which is bound to the carbon atom of the amidine group, for example a pyrazolyl-, imidozolyl-, triazolyl- or tetrazolyl-group which may, if desired, be substituted with lower alkyl groups.

Satisfactory results were obtained for example with the use of reactive cyanamide derivatives of the Formula VII, wherein X is a dialkylpyrazolyl-radical of the formula

For example, an amine of the Formula VI is reacted with an acid addition salt, for example the hydrochloric, nitric, phosphoric or sulphuric acid salt of a compound of the formula

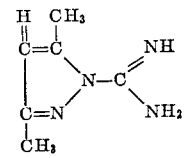

wherein the acid addition salt of the indolylalkylguanidine of the Formula I is formed, while 3,5-dimethylpyrazol is separated out. The reaction is preferably carried out in a solvent, for example water, an alcohol, for example ethanol or methanol, dimethylformamide, or mixtures thereof or of other solvents which are inert for the reaction.

It has been found that the compounds according to the invention can be obtained with a satsifactory yield by reacting an amine of the Formula VI or a salt thereof with cyanamide. Use is preferably made of a salt of the amine with a strong acid, for example hydrochloric acid, nitric acid, sulphuric acid or picric acid. The reaction may be performed without a solvent by heating the reactants together to the melting point, but the use of a solvent is to be preferred. Suitable solvents of this kind are for example water, alcohols, for example methanol or ethanol, chlorobenzene or dimethylformamide or mixtures thereof. If use is made of a solvent, the reaction is usually carried out at a temperature between 20° C. and 200° C., preferably however at the boiling temperature of the reaction mixture.

As an alternative the reaction may be carried out so that the cyanamide in the reaction medium is first formed by the reaction of calcium cyanamide (CaCN₂) with the solvent.

Use is preferably made of a large excess quantity (2 to 10-fold quantity) of cyanamide, since during the reaction part of the cyanamide is withdrawn from the reaction, since in a side reaction also dicyandiamide is formed.

According to the invention, the new compounds of my invention and their salts are brought in a therapeutically suitable mode of administration by methods known per se. For example, new pharmaceutical compositions are obtained which are characterized by a content of at least one of the new compounds according to the invention in a concentration of from 1–1500 mg. per dosage unit.

As examples of these pharmaceutical compositions may be mentioned injection liquids, draughts, powders, pills, suppositories, tablets and coated tablets.

For the preparation of these compositions the conventional pharmaceutical technologies and materials may be used. For example, for the preparation of injection liquids solutions in water of salts of the new guanidines in a concentration of from 1–50 mg./ml. rendered isotonic with blood by means of table salt are used. Alternatively, mixtures of water and alcohols, for example glycerol or benzyl alcohol, may be used as liquid diluents.

Solid pharmaceutical dosage unit forms are prepared in normal manner by taking up the active substance in solid pharmaceutical carrier materials, for example, lactose, powdered sugar, potato starch talcum, magnesium stearate, gum arabic, gelatin, calcium phosphate and/or titanium dioxide and processing the mixture to tablets or coated tablets.

In order that the invention may readily be carried into effect it will now be described, in greater detail with reference to the following specific examples.

*Example 1.—1-phenylethyl-1-[2-(5-benzyloxyindole-3-yl)-ethyl] guanidine*

(a) *5-benzyloxy - N - phenylethylindole - 3 - glyoxylamide.*—12.8 g of 5 - benzyloxyindole - 3 - glyoxyoylchloride were added in portions and while stirring and cooling by means of icy water to 14.5 g. of phenyl ethyl amine in 200 ml. of absolute diethylether. After the addition stirring was continued for another 2 hours. After having been left to stand over one night at room temperature, the reaction mixture was stirred for another hour at this temperature. Then 50 ml. of water were added and stirring was continued for 15 minutes. The amide formed was sucked off and washed with water until the wash water was neutral and no chlorine ions could be demonstrated in it any longer. The resulting product was dried in air. Yield 16 g. of the above substance with melting point 238–241° C.

(b) *5-benzyloxy - 3 - (2-phenyl - ethyl-aminoethyl)-indole.*—The amide described sub (a), suspended in 500 ml. of dry tetrahydrofurane, was added to 9 g. of lithium aluminum hydride in 300 ml. of absolute tetrahydrofurane. The mixture was boiled for 8 hours. After having been left to stand over night at room temperature, 27 ml. of water were added to the reaction mixture. The formed precipitation was sucked off and thoroughly washed with tetrahydrofurane. The wash liquid was added to the filtrate and then 5 g. of oxalic acid 2 aq. in 100 ml. of acetone. The mixture was evaporated to dryness in vacuo and a mixture of 200 ml. of absolute diethylether and 30 ml. of acetone were added to the residue. The crystalline substance was sucked off and stirred with 100 ml. of acetone. After filtration, washing with acetone and drying in air 7.7 g. of the bioxalate of the above indolylethylamine were obtained, melting point 170–190° C. (decomposition). This substance was dissolved while boiling in a mixture of 50 ml. of water, 450 ml. of ethanol and 400 ml. of methanol. Then 20 ml. of 2 N potassium hydroxide solution and 50 ml. of water were added. Subsequently this mixture was evaporated in vacuo to a volume of approximately 100 ml. Then 100 ml. of water were added and again evaporated in vacuo until water began to distill over. After cooling extraction was carried out with 50, 25, 25, and 10 ml. of carbon tetrachloride respectively. After drying by means of $Na_2SO_4$, the solvent of the collected extracts was removed by evaporation in vacuo. The residue, 6.97 g. of the above indolylethylamine was used without further purification in the following reaction.

(c) *1-phenylethyl - 1 - [2-(5-benzyloxyindole-3-yl)-ethyl]-guanidinehydrochloride.*—6.52 g. of the amine described sub (b) were dissolved in 14 ml. of absolute ethanol. This solution was acidified with 2.8 N hydrochloric acid in ethanol until the pH of the mixture was 4. Then 7 g. of cyanamide were added and the mixture was boiled for 17 hours. After cooling the liquid was purified by filtration and then 30 ml. of absolute ethanol were added. Then the mixture was diluted with 250 ml. of absolute diethylether in which crystallization occurred. After one hour the crystallizate was filtered off, washed with ether and dried in air.

5.8 g. of the above substance were obtained with melting point 217–219° C. After recrystallization from butyl alcohol the melting point was 220–221° C.

*Example 2.*—*1-ethyl-1-[2-(5-hexyloxyindole-3-yl)-ethyl] guanidine-hydrochloride*

(a) *5-hexyloxyindole - 2 - carbonic-acid-ethyl ester.*—1000 g. of ice were added to a solution of 192 g. of p-hexyloxyaniline in 1000 ml. of a solution of 15% hydrochloric acid in water. Then while stirring, a solution of 75 g. of sodium nitrate in 200 ml. of water were added below the surface of the liquid at such a rate that the temperature remained below 5° C. After purification by filtration the reaction mixture was rapidly added, while stirring, to a mixture of 160 g. of ethyl methyl acetoacetate, 1000 ml. of ethanol, 1000 g. of ice and 820 g. of sodium acetate. The mixture was stirred for two hours and then extracted 4 times with 500 ml. of benzene. The collected benzene extract were washed with water, dried by means of $Na_2SO_4$, filtered and then the benzene was evaporated under reduced pressure. The residue was taken up in 175 ml. of ethanol, cooled to 0° C. and 500 ml. of cold ethanol saturated with hydrochloric acid were rapidly added to this solution, while stirring. During this addition the mixture began to boil. The mixture was stirred for another hour. Then 100 ml. of water were added and the solution was stored cool for 20 hours, after which the above ester was filtered off. Yield 140 g. Melting point 96–98° C.

(b) *5-hexyloxyindole-2-carboxylic acid.*—The ester obtained according to (a) was added to 56 g. of KOH in 1050 ml. of 90% ethanol and the mixture was boiled for 90 minutes. Then the mixture was poured in 6000 ml. of water, the liquid acidified with 200 ml. of concentrated hydrochloric acid and the precipitate was filtered off, washed with water and dried. Obtained were 128 g. of the above acid with melting point 155–165° C.

(c) *5-hexyloxyindole.*—A mixture of 63 g. of the product obtained (b), 60 ml. of freshly distilled quinoline and 2 g. of copper chromite were heated to 210–230° C. while stirring and under nitrogen until no $CO_2$ development occurred.

After cooling 500 ml. of diethyl ether were added and the mixture was filtered. The filtrate was successively extracted 3 times with 200 ml. of 2 N HCl, once with 200 ml. of water, twice with 100 ml. of 2 N sodium hydroxide solution, twice with 100 ml. of water and then dried by means of $Sa_2SO_4$. After evaporating the ether, 36 g. of 5-hexyloxyindole with melting point 48–51° C. were obtained.

(d) *5-hexyloxyindole-3-glyoxyloylchloride.*—To a solution of 10 g. of 5 hexyloxyindole in 200 ml. of absolute diethyl ether was added dropwise, while stirring and cooling by means of icy water, a solution of 7.5 ml. of oxalylchloride in 30 ml. of absolute diethylether at such a rate that the temperature of the mixture did not exceed 5° C. The reaction mixture was stirred for another 30 minutes at a temperature between 0 and 5° C. Then the formed solid was filtered off and washed with ether, dried in vacuo over KOH. Obtained were 12.5 g. of the above chloride of melting point 125–127° C.

(e) *N - ethyl - 5 - hexyloxyindole-3-glyoxylamine.*—12.5 g. of the product obtained according to (d) were added in portions, while stirring and cooling by means of icy water, to 150 ml. of 33% aqueous ethylamine solution at such a rate that the temperature remained below 15° C. Then stirring was continued for another 12 hours, the mixture being kept cool with icy water. Then the above amine was filtered off and washed with water and dried. Yield 12.66 g. Melting point 206–208° C.

(f) *3-(2-ethylaminoethyl) - 5 - hexyloxyindole.*—12.66 g. of the product obtained according to (e) in 500 ml. of absolute tetrahydrofurane were added to 8 g. of $LiAlH_4$ in 300 ml. of absolute tetrahydrofurane. Then the mixture was boiled for 7 hours and left to stand overnight at room temperature. Then 24 ml. of water were added the precipitate was filtered off with suction and the filtrate was concentrated in vacuo leaving an oil. This oil was dissolved in 40 ml. of acetone and to this solution was added a solution of 3.4 g. of oxalic acid 2 aq. in 40 ml. of acetone. The white precipitate, the bioxalate of the above indolethylamine, was filtered off, washed with acetone and dried in air. Yield 7.86 g. Melting Point 130–160° C. (decomposition). 7.80 g. of this salt were dissolved, while heating, in 100 ml. of ethanol and 70 ml. of water, then 40 ml. of 2 N potassium hydroxide solution were added, after which the alcohol was evaporated under reduced pressure. Then extraction was carried out with 25, 15 and 10 ml. of carbon tetrachloride respectively. After drying by means of $Na_2SO_4$ and evaporating the carbon tetrachloride, 6.1 g. of the free amine were obtained.

(g) *1 - ethyl - 1 - [2(5 - hexyloxyindole - 3 - yl)ethyl] guanidine-hydrochloride.*—5.9 g. of the product obtained according to (f) were dissolved in 20 ml. of absolute ethanol. This solution was then brought to pH=4 with 2.8 N ethanolic hydrochloric acid solution. Then 10 g. of cyanamide were added and the mixture was boiled for 20 hours. After cooling the liquid was purified by filtration and then 250 ml. of absolute diethyl ether were added. 5.2 g. of the substance crystallized out which had a melting point of 175–180°. By recrystallization of this substance from butyl alcohol 4.5 g. of the above guanidine were obtained with melting point 180–180.5° C.

*Example 3.—1 - phenylethyl-1-[2(5-methoxyindole-3-yl)-ethyl] guanidine*

(a) *5 - methoxy - N - phenylethylindole-3-glyoxylamide.*—In a manner quite corresponding to that described in Example 1(a) the above amide was obtained by reaction of 5-methoxyindole-3-glyoxyloxlchloride with phenylethylamine.

(b) *5 - methoxy - 3 - (2-phenylethylaminoethyl) indole.*—The reduction of the amide mentioned sub (a) was performed in a manner quite analogous to the reaction described in Example 1(b). The bioxalate of the above amine had a melting point of 191–195° C., the free amine 111–113° C.

(c) Quite in accordance with the method described in Example 1(c) the above guanidine was obtained from the indolylethylamine obtained according to (b), the hydrochloric acid salt of which had a melting point of 188.5–190.5° C.

*Example 4.—1 - octyl - 1 - [2(5-benzyloxyindole-3-yl)-ethyl] guanidine hydrochloride*

(a) *5 - benzyloxy - N - octyl-indole-3-glyoxylamine.*—In a manner quite corresponding to that described in Example 1(a), the above amide was obtained by causing 5 benzyloxyindole 3-glyoxyloylchloride to react with N octylamine. Melting Point 204–206° C.

(b) *5-benzyloxy-3-(2-octylaminoethyl)indole.*—A suspension of 15.9 g. of the above amide in 500 ml. of anhydrous tetrahydrofurane was added to 9 g. of lithium aluminum hydride in 300 ml. of anhydrous tetrahydrofurane. The mixture was boiled for 8 hours. After the reaction mixture had been left to stand overnight at room temperature, 27 ml. of water were added. A precipitate was formed which was sucked off over hyflo and then thoroughly washed with tetrahydrofurane. The filtrate was evaporated to dryness in vacuo and the residue dissolved in 60 ml. of acetone. To this solution was added a solution of 3.3 g. of oxalic acid 2 aq. in 40 ml. of acetone, after which the oxalate crystallized. This substance was sucked off and washed with acetone. After drying in air 9.48 g. of oxalate of the above indolylethylamine were obtained; melting point 151–153° C. This substance was dissolved, while boiling, in 200 ml. of 70% ethanol, after which 35 ml. of 2 N potassium hydroxide solution were added. Then this mixture was evaporated in vacuo to approximately 75 g., diluted with 50 ml. of water and again evaporated in vacuo to 80 g. The cooled residue was extracted three times with totally 100 ml. of chloroform and the solvent of the extract was removed in vacuo after drying over Na₂SO₄. The residue, 7.0 g. of the above amine, was used in the following reaction without further purification.

(c) *1 - octyl-1-[2(5-benzyloxyindole - 3 - yl)-ethyl] guanidine hydrochloride.*—6.9 g. of the amine described sub (b) were dissolved in 27 ml. of absolute ethanol. This solution was acidified with 2.8 N hydrochloric acid in ethanol until the pH of the mixture was 3.5. Then 9 g. of cyanamide were added to the solution and the mixture was boiled for 20 hours. After cooling, the resulting crystaline substance was sucked off and washed with 3×10 ml. of ethanol. After drying in air 3.19 g. of the above substance were obtained with melting point 227–228° C. By diluting the filtrate of the 3.19 g. with absolute ether, another two fractions were obtained (together 4.04 g.) with a corresponding melting point. One recrystallization of the collected crystallizates from 100 ml. of butyl-alcohol yielded 6.41 g. of the above hydrochloride with melting point 227.5–228.5°.

*Example 5.—1-phenylethyl-1-[2(5-hexyloxyindole-3-yl)-ethyl] guanidine hydrochloride*

(a) *N-phenylethyl-5-hexyloxyindole-3-glyoxylamide.*—11.75 g. of the 5 hexyloxyindole 3 glyoxyloylchloride obtained according to Example 2(d) were added in portions while stirring and cooling by means of icy water to 13.3 g. of 2 phenyl-ethylamine in 350 ml. of ether. Stirring was continued for another 90 minutes while cooling with ice. Then 75 ml. of ether were added and stirring was continued for another 15 minutes. The formed amide was sucked off and washed with water. After drying in air 13.78 g. of the above substance were obtained with melting point 201–203° C.

(b) *5-hexyloxy - 3 - [2(2-phenylethylamino)ethyl] indole.*—The amine described sub (a), dissolved in 500 ml. of anhydrous tetrahydrofurane, was added to 8 g. of lithium-aluminumhydride in 300 ml. of anhydrous tetrahydrofurane. Then the mixture was boiled for 8 hours. After the reaction mixture had been left to stand overnight at room temperature, 24 ml. of water were added. The formed hydroxides were sucked off and thoroughly washed with tetrahydrofurane. The filtrate and the wash liquid were evaporated in vacuo together and the resulting residue, after dissolving in 40 ml. of acetone, was added to a solution of 3 g. of oxalic acid 2 aq. in 40 ml. of acetone. The crystallized substance was sucked off and washed with acetone. After drying in air 8.8 g. of oxalate of the above amine were obtained with melting point 129–131°.

This substance was dissolved while heating in 220 ml. of 75% ethanol and, after the addition of 30 ml. of 2 N potassium hydroxide solution, this solution was evaporated in vacuo to 90 g. Then 50 ml. of water were added and the mixture was again evaporated in vacuo to 80 g. Then the cooled mixture was extracted with 50, 25, 15 and 10 ml. of chloroform respectively. Of the collected chloroform extracts, the chloroform was removed by evaporation in vacuo, after drying by means of Na₂SO₄. The remaining amine (7.0 g.) was used in the following reaction without further purification.

(c) *1-(2-phenylethyl)-1 - [2(5-hexyloxyindole-3-yl)-ethyl] guanidine hydrochloride.*—A solution of 7.0 g. of the amine described sub (b) in 27 ml. of absolute ethanol was brought to pH 4 by means of 2.8 N hydrochloric acid in ethanol. After the addition of 10 g. of cyanamide, this solution was boiled for 13 hours. Then the reaction mixture was cooled, filtered and diluted with 400 ml. of ether, crystallization occurring. After 30 minutes, the crystallizates was sucked off and washed with ether. Drying in air yielded 3.17 g. with melting point 186.5–187.5° C. After diluting the filtrate with 500 ml. of ether and cooling for three hours in the refrigerator another 2.12 g. of substance were obtained with melting point 185.5–186° C. One recrystallization from butylalcohol yielded the entirely pure above hydrochloride with melting point 187.5–188.5° C.

*Example 6.—1-benzyl-1-[2(5-octyloxyindole-3-yl)-ethyl] guanidine hydrochloride*

(a) *5-octyloxyindole - 2 - carboxylic acid ethylester.*—500 g. of ice were added to an emulsion of 110.5 g. of p-octyloxyaniline in 300 ml. of water and 200 ml. of concentrated hydrochloric acid. The emulsion was then cooled to −10° and a solution of 41 g. of sodium nitrite in 100 ml. of water was added, while stirring and below the surface of the liquid, at such a rate that the temperature remained below −5°. After stirring for 15 minutes the reaction mixture was rapidly added, while stirring, to a mixture of 78.3 g. of ethyl or methyl acetoacetate, 450 g. of sodium acetate, 500 ml. of methanol, and 500 g. of ice. The mixture was stirred for two hours and then extracted with 500 ml. and 4×250 ml. of benzene. The collected benzene extracts were washed with water, dried by means of $Na_2SO_4$ and evaporated in vacuo, after filtration of the drying agent, until the benzene was removed. The residue was dissolved in 150 ml. of ethanol, the solution cooled in ice and 250 ml. of cold ethanol saturated with hydrochloric acid were rapidly added to this solution while stirring. During the addition the mixture started to boil. The mixture was stirred for another two hours and after having been left to stand overnight at room temperature 50 g. of ice were added, after which the above ester crystallized out and was sucked off. After filtration, washing with ethanol and water and drying in air 92.7 g. of substance were obtained with melting point 89–91° C.

(b) *5-octyloxyindole-2-carboxylic acid.*—The ester obtained according to (a) was added to 26.5 g. of KOH in 500 ml. of ethanol and 25 ml. of water and the mixture was boiled for 90 minutes. Then the mixture was poured into 1250 ml. of water and 1250 g. of ice. The liquid was acidified with 75 ml. of concentrated hydrochloric acid and heated on the steam bath. After one hour the crystallized substance was sucked off, washed with water and dried in air. In this manner 72.4 g. of the above carbonic acid were obtained with melting point 124–127° C.

(c) *5-octyloxyindole.*—A mixture of 76.5 g. of the carboxylic acid obtained according to (b) 70 ml. of freshly distilled quinoline and 2.5 g. of copper chromite was heated while stirring and under nitrogen, at 210–230° for 3 hours. After cooling 500 ml. of ether were added and the mixture was filtered. The filtrate was successively extracted three times with 200 ml. of 2 N HCl, 1× with 150 ml. of water, 1× with 100 ml. of 2 N NaOH and 2× with 100 ml. of water. The ethereal solution was then dried by means of $Na_2SO_4$ and evaporated in vacuo. Distillation of the residue in vacuo yielded 51.4 g. of 5 octyloxyindole with boiling point 0.3 mm. Hg 170–174° and melting point 61–63°.

(d) *5-octyloxy-3-glyoxyloylchloride.*—A solution of 16 ml. of oxalylchloride in 65 ml. of absolute ether was added, while stirring and cooling by means of icy water, to a solution of 24.5 g. of 5-octyloxyindole in 350 ml. of absolute ether at such a rate that the temperature of the mixture did not exceed 5° C. After everything had been added, stirring was continued for another 30 minutes while cooling with ice, after which 100 ml. of absolute ether were added. The formed solid was sucked off, washed with ether and dried in vacuo over KOH. Obtained were 29.0 g. of the above acid chloride with melting point 131–132° (decomposition).

(e) *N-benzyl-5-octyloxyindole-3-glyoxylamide.*—14 g. of the product obtained according to (e) in 500 ml. of portions, while stirring and cooling by means of icy water, to 13.9 g. of benzylamine dissolved in 500 ml, of dry ether at such a rate that the temperature of the reaction mixture remained below 15°. After stirring for 90 minutes while cooling with ice 50 ml. of water were added and the solid formed was sucked off. After washing with water and drying in air 14.1 g. of the above amide were obtained with melting point 168–169.5°.

(f) *3-(2-benzylaminoethyl)-5-octyloxyindole.*—14.1 g. of the product obtained according to (e) in 500 ml. of absolute tetrahydrofurane were added to 8 g. of lithium aluminum hydride in 300 ml. of absolute tetrahydrofurane. After boiling the mixture for 8 hours and leaving to stand overnight at room temperature, 24 ml. of water were added. The formed hydroxides were sucked off and washed with tetrahydrofurane. The filtrate and the washed liquid were evaporated in vacuo until the solvent has been removed and the resulting residue, after dissolving in 50 ml. of acetone, was added to a solution of 2.9 g. of oxalic acid 2 aq. in 40 ml. of acetone. The oxalate formed was sucked off, washed with acetone and dried in air. Yield 6.0 g. melting point 180–181° (decomposition). The oxalate was dissolved in 150 ml. of 70% ethanol and the solution evaporated in vacuo to 55 g. after the addition of 30 ml. of 2 N potassium hydroxide solution. Another 35 ml. of water were added and the solution was again evaporated to 65 g. Then the residue was extracted with 50 ml. of chloroform and then another two times with 25 ml. of chloroform. This chloroform extract, after drying by means of $Na_2SO_4$ and evaporating the chloroform, yielded the above amine.

(g) *1-benzyl-1-[2(5-octyloxyindole-3-yl)-ethyl] guanidine hydrochloride.*—4.5 g. of the amine obtained according to (e) were dissolved in 15 ml. of absolute ethanol. After acidifying with 2.8 N ethanolic hydrochloric acid solution to pH 4 and adding 5 g. of cyanamide the solution was boiled for 17.5 hours. After cooling the formed crystallizate was sucked off and washed with ether. In this manner 4.0 g. were obtained with melting point 246–248° C. By dissolving the substance in 35 ml. of ethanol and adding 50 ml. of absolute ether 3.56 g. of the above hydrochloride were obtained with melting point 243–245° C.

*Example 7.—1-ethyl-1[2(5-octyloxyindole-3-yl)-ethyl] guanidine hydrochloride*

(a) *N-ethyl-5-octyloxyindole-3-glyoxylamide.*—14.5 g. of the acid chloride obtained according to Example 6(d) were added in portions, while stirring and cooling with icy water, to 150 ml. of 33% aqueous ethylamine solution. After stirring for 90 minutes the above amide was sucked off, washed with water and dried in air. Yield 14.5 g. with melting point 198–200° C. (decomposition).

(b) *5-octyloxy-3-(2-ethylaminoethyl) indole.*—The reduction of the amide obtained sub (a) was carried out in a manner quite analogous to the reaction described in Example 6(e). The oxalate melted from 130–140° C.

(c) *1-ethyl-1-[2(5-octyloxyindole-3-yl)-ethyl] guanidine hydrochloride.*—7.34 g. of the above amine were dissolved in 25 ml. of ethanol and acidified to pH 4 with 2.8 N ethanolic hydrochloric acid. After the addition of 10 g. of cyanamide the solution was boiled for 19 hours. After cooling the solution was filtered and 400 ml. of absolute ether were added to the filtrate. After two hours the formed substance was sucked off, washed with ether and dried. From the 7.0 g. of substance with melting point 165–167° C., 6.25 g. of the above guanidine hydrochloride with melting point 172–172.5° C. were obtained after dissolving in 30 ml. of ethanol and adding 50 ml. of dry ether.

*Example 8.—1-{2(3,4-dimethoxyphenyl) ethyl}-1-[2(5-benzyloxyindole-3-yl)-ethyl] guanidine hydrochloride*

(a) *5-benzyloxy-N-{2-(3,4 - dimethoxyphenyl) - ethyl} indole-3-glyoxylamide.*—12.5 g. of 5-benzyloxyindole-3-glyoxyloylchloride were added in portions to a solution of 16.8 g. of 2-(3,4-dimethoxy-phenyl) ethylamine in 200 ml. of ether while stirring and cooling with ice. Stirring and cooling with ice were continued for another 30 minutes. After the reaction mixture had been left to stand overnight at room temperature, 50 ml. of water were added, after which the formed amide was sucked off and washed with water. After drying in vacuo over KOH 16.9 g. of the above substance were obtained with melting point 185–190° C.

(b) *5-benzyloxy-3-[2-{2(3,4-dimethoxyphenyl) - ethylamino} ethyl] indole.*—The amide described (a), dissolved in 300 ml. of warm anhydrous tetrahydrofurane, was added to a solution of 8.5 g. of lithium aluminum hydride in 275 ml. of anhydrous tetrahydrofurane. Then the mixture was boiled for 8 hours. After the reaction mixture had been left to stand overnight at room temperature, 25.5 ml. of water were added. The formed hydroxides were sucked off and washed with tetrahydrofurane. The filtrate and the wash liquid were together evaporated in vacuo and the resulting residue was added, after dissolution in 75 ml. of acetone, to a solution of 3 g. of oxalic acid 2 aq. in 40 ml. of acetone. After cooling for a few hours in the refrigerator the oxalate of the above amine was sucked off and washed with acetone. After drying in air 5.3 g. of substance were obtained with melting point 186–188° C.

12.5 ml. of 2 N KOH were added to this substance which was suspended in 50 ml. of warm 60% ethanol. The resulting clear solution was evaporated in vacuo to 42 g. Then 20 ml. of water were added and the solution was again evaporated in vacuo to 45 g. This residue was extracted with 3× 15 ml. of carbon tetrachloride. This extract yielded, after drying with $Na_2SO_4$ and evaporating the carbon tetrachloride, 4.3 g. of the above amine.

(c) *1 - {2 - (3,4 - dimethoxyphenyl) - ethyl} - 1 - [2(5-benzyloxyindole-3-yl)-ethyl] guanidine hydrochloride.*—4.3 g. of the above amine were dissolved in 12.5 ml. of absolute ethanol. After acidifying with ethanolic hydrochloric acid to pH 4 and adding 4 g. of cyanamide, the solution was boiled for 17 hours. After cooling 200 ml. of absolute ether were added. The crystallized substance was sucked off and washed with ether. The substance was dissolved in 70 ml. of ethanol. After the addition of 50 ml. of absolute ether to this solution, 3.72 g. of the above hydrochloride were obtained with melting point 143–145° C. (vitrification). Melting point after recrystallization from ethanol: 146–147° C.

After the addition of the cyanamide to the salt of the amine of the Formula VI, a salt of the indolylalkylguanidine of my invention is obtained, which can be separated out of the reaction mixture as such by conventional methods. By known methods the free base can be formed from this salt, for example by dissolving the salt in water, to which aqueous solution is added alkali, after which the free guanidine base is extracted with the aid of an organic liquid not miscible with water.

*Example 9.—1-ethyl-1-[2-(5-methoxyindol-3-yl)-ethyl] guanidinehydrochloride*

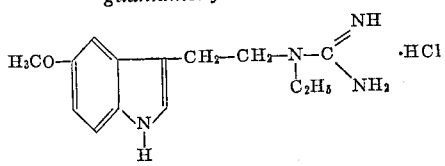

A solution of 19.62 g. of N-ethyl-5-methoxy-tryptamine in 100 mls. of absolute ethanol was acidified carefully with alcoholic hydrochloric acid until the pH was 4. After the addition of 42.0 gms. of cyanamide the solution was boiled for 16 hours. After cooling the crystallized dicyandiamide was filtered off and washed three times with 50 mls. of absolute ethanol. The filtrate and the washing liquid were added and diluted with absolute ether until the solution was just at the point of becoming turbid. After a few hours in the refrigerator the crystallized substance was filtered off and washed with absolute ether. The yield was 20.66 g. (melting point 182–188° C.). After recrystallization from 100 mls. of n-butanol 18.44 gms. of 1-ethyl-1-[2-(5-methoxyindol-3-yl)-ethyl]-guanidinehydrochloride with a melting point of 188–189° C. was obtained.

*Example 10.—1-ethyl-1-[2-(5-methoxyindol-3-yl)-ethyl] guanidinenitrate*

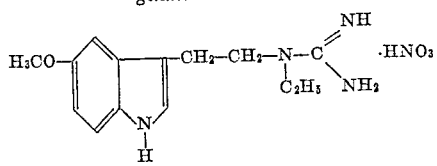

0.30 gm. of the hydrochloride of Example 9 was dissolved in 4 mls. of water, after which 4.0 g. of ammonium nitrate was added. The nitrate of the guanidine crystallized out. After filtering, washing with a small quantity of water and drying in air the substance had a weight of 0.32 g., melting point 170–177° C. After crystalling twice from alcohol/ether 0.24 gm. was obtained, which had a melting point of 181–183.5 °C.

*Example 11.—1-ethyl-1-[2-(5-methoxyindol-3-yl)-ethyl] guanidinebenzoate*

0.15 gm. of the hydrochloride of Example 9 was dissolved 1 ml. of water, after which 0.60 gm. of sodiumbenzoate was added. A clear solution was obtained, from which the guanidinebenzoate crystallized after scratching. After filtering, washing with water and drying in air the substance had a weight of 0.20 g. After recrystallization from alcohol/ether 0.13 gm. was obtained; melting point 144–146° C.

*Example 12.—1-butyl-1-[2-(5-methoxyindol-3-yl)-ethyl] guanidinehydrochloride*

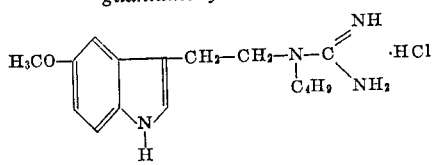

In the manner described in Example 9 N-butyl-5-methoxy-tryptamine (B.P.$_{0.2}$ 160–164° C.; melting point 57–68° C.)—obtained by the reaction of 5-methoxy-tryptamine with butyrylchloride followed by the reduction of the amide with $LiAlH_4$—by treatment with cyanamide was converted into the corresponding guanidine-hydrochloride, melting point 187.5–190° C.

*Example 13.—1-isopropyl-1-[2-(5-methoxyindol-3-yl)-ethyl] guanidinehydrochloride*

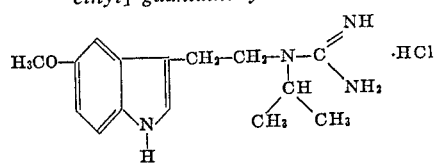

By the reaction of 5-methoxyindol-3-glyoxyloylchloride with isopropylamine in ether N-isopropyl-5-methoxyindol-3-glyoxylamide (melting point 216–218° C.) was obtained, which was converted with $LiAlH_4$ into N-isopropyl-5-methoxytryptamine by reduction. By the method described in Example 9 this amine was converted into the corresponding guanidine-hydrochloride, melting point 167–180° C.

*Example 14.—1-[2-(5-methoxyindol-3-yl)-ethyl]-1-methyl-guanidinehydrochloride*

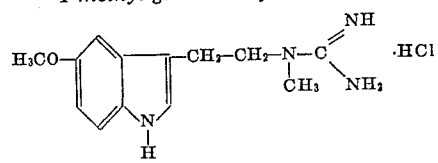

By the method described in Example 9 5-methoxy-N-methyltryptamine was converted into the corresponding guanidinehydrochloride, melting point 220–223.5° C.

*Example 15.—1-[2-(5-benzyloxyindol-3-yl)ethyl]-1-ethylguanidinehydrochloride*

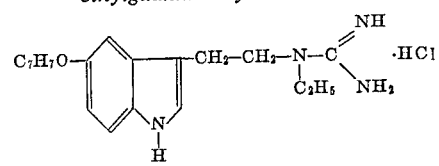

By the method described in Example 1 5-benzyloxy-N-ethyltryptamine was converted into the corresponding guanidinehydrochloride, melting point 194–196.5° C.

*Example 16.—1-ethyl-1-[2-(5-hydroxyindol-3-yl)ethyl]-guanidinehydrochloride*

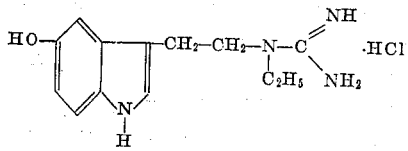

2.00 g. of 1-[2-(5-benzyloxyindol-3-yl)-ethyl]-1-ethyl-guanidinehydrochloride was dissolved in 40 mls. of absolute ethanol and after the addition of 2.5 mls. of 1% $PdCl_2$ solution and 0.25 g. of active carbon at room temperature under a pressure of 1.1 atmospheres was hydrogenized. After the hydrogen adsorption had terminated, the solution was filtered and the filtrate was inspissated in vacuo. After washing with ether, the substantially solid residue was heated with 20 mls. of n-butanol. After cooling the solid substance was filtered off and washed with cold n-butanol. The yield was 1.28 g. (melting point 214–216.5° C.).

*Example 17.—1-[2-(5-ethoxyindol-3-yl)ethyl]-1-ethyl-guanidinehydrochloride*

From 5-ethoxyindol was formed with oxalylchloride the 5-ethoxy-indol-3-glyoxyloylchloride (melting point 125–133° C., while decomposing). This acid chloride was converted with 33% aqueous ethylamino-solution into the corresponding N-ethylglyoxylamide (melting point 132.5–134° C.), which was then reduced with $LiAlH_4$ to 5-ethoxy-N-ethyltryptamine (B.P.$_{0.15}$ 169–171° C.; melting point 75–81° C.). By the method described in Example 9 this amine was converted into the corresponding guanidine-hydrochloride, melting point 192–193.5° C.

*Example 18.—1-ethyl-1-[2-(indol-3-yl)ethyl]guanidinehydrochloride*

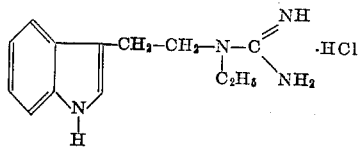

By the method described in Example 9 N-ethyl-tryptamine was converted into the corresponding guanidinehydrochloride, melting point 216–219° C.

*Example 19.—1-ethyl-1-[(5-methoxyindol-3-yl)-methyl]guanidinehydrochloride*

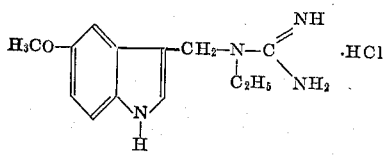

(a) *3-(ethylaminomethyl)-5-methoxyindol.*—To a solution of 5.04 g. of 5-methoxyindol-3-carboxaldehyde in 150 mls. of ethanol was added 0.40 g. of Adams catalyst and 10 mls. of 33% ethylamino solution in water. The mixture was hydrogenized. After the hydrogen absorption had terminated, the solution was filtered and the filtrate was inspissated in vacuo at about 40° C. until the ethanol had disappeared. The crystallized amine was dissolved in 150 mls. of ether. The solution was washed three times with 20 mls. of water and dried on $Na_2SO_4$, after which the ether was evaporated in vacuo. The residue (5.1 g.) was converted into the hydrochloric acid salt by dissolving in 15 mls. of absolute ethanol and acidifying it to a pH of 4 with alcoholic hydrochloric acid. The solution was diluted with absolute ether to an extent such that turbidity was just avoided. There crystallized out 4.51 g. of hydrochloride of 3-(ethylaminomethyl)-5-methoxyindol, melting point of 159–160° C. After recrystallization from a mixture of ethanol and ether, 4.16 g. was obtained, having a melting point of 167–167.5° C.

(b) *1-ethyl-1-(5-methoxyindol-3-yl)-methyl-guanidine-hydrochloride.*—To a suspension of 5.40 g. of 3-(ethylaminomethyl)-5-methoxyindol-hydrochloride in 25 mls. of absolute ethanol was added 11.0 gms. of cyanamide. The mixture was boiled for 15 hours and after cooling, the crystallized dicyanamide was filtered off and washed three times with 10 mls. of absolute ethanol. The filtrate and the washing liquid were joined and diluted with absolute ether to an extent such that no turbidity was produced. 1.72 g. of the substance was crystallized out; melting point 181–188° C. After recrystallization from 50 mls. of ethanol and 95 mls. of absolute ether 1.44 gms. of 1-ethyl-1-(5-methoxyindol-3-yl) methylguanidinehydrochloride, melting point 186–190° C., was obtained.

*Example 20.—1-ethyl-1-[2-(5,6-dimethoxyindol-3-yl)ethyl] guanidinehydrochloride*

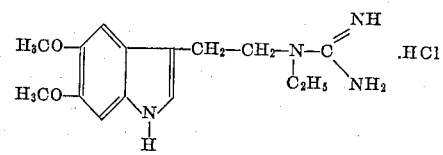

By the method described in Example 9 N-ethyl-5,6-dimethoxytryptamine was converted into the corresponding guanidinehydrochloride, melting point 189–191° C.

While I have described my invention in connection with specific embodiments and applications, other modifications thereof will be readily apparent to those skilled in this art without departing from the spirit and scope of the invention as defined in the appended claims.

What I claim is:

1. An indolylethylguanidine compound of the formula:

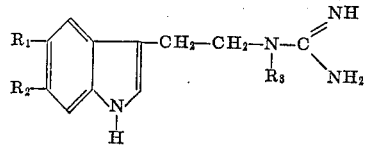

wherein $R_1$ and $R_2$ are each selected from the group consisting of hydrogen, hydroxy, alkoxy of 1–10 carbon atoms and aralkoxy of 7–10 carbon atoms, $R_3$ is selected from the group consisting of alkyl of 1–10 carbon atoms, aralkyl of 7–10 carbon atoms, aralkyl of 7–10 carbon atoms which may be substituted with from 1 to 2 unsubstituted alkoxy groups of 1–3 carbon atoms, at least one of said groups designated by $R_1$ and $R_2$ being other than hydrogen and at least one of said groups designated by $R_1$–$R_3$ containing at least 6 carbon atoms and the pharmaceutically acceptable acid addition salts thereof.

2. An indolylethylguanidine compound of claim 1 wherein $R_1$ is alkoxy of 6 to 10 carbon atoms, $R_2$ is hydrogen and $R_3$ is alkyl.

3. An indolylethylguanidine compound of claim 1 wherein $R_2$ is alkoxy of 6 to 10 carbon atoms, $R_1$ is hydrogen and $R_3$ is alkyl.

4. An indolylethylguanidine compound of claim 1 wherein $R_1$ is alkoxy of 6 to 10 carbon atoms, $R_2$ is hydrogen and $R_3$ is aralkyl.

5. An indolylethylguanidine compound of claim 1 wherein $R_2$ is alkoxy of 6 to 10 carbon atoms, $R_1$ is hydrogen and $R_3$ is aralkyl.

6. An indolylethylguanidine compound of claim 1 wherein $R_1$ is alkoxy of 6 to 10 carbon atoms, $R_2$ is hydrogen and $R_3$ is aralkyl of 7 to 10 carbon atoms substituted with from 1 to 3 alkoxy groups of 1–3 carbon atoms.

7. An indolylethylguanidine compound of claim 1 wherein $R_2$ is alkoxy of 6 to 10 carbon atoms, $R_1$ is hydrogen and $R_3$ is aralkyl of 7 to 10 carbon atoms substituted with from 1 to 2 alkoxy groups of 1–3 carbon atoms.

8. A member of the group consisting of 1-phenylethyl-

1-[2(5-benzyloxyindole-3-yl)-ethyl] guanidine and the pharmaceutically acceptable acid addition salts thereof.

9. A member of the group consisting of 1-ethyl-1[2(5-hexyloxyindole-3-yl)-ethyl] guanidine and the pharmaceutically acceptable acid addition salts thereof.

10. A member of the group consisting of 1-ethyl-1-[2(5-octyloxyindole-3-yl)-ethyl] guanidine and the pharmaceutically acceptable acid addition salts thereof.

11. A member of the group consisting of 1-octyl-1-[2(5-benzyloxyindole-3-yl)-ethyl] guanidine and the pharmaceutically acceptable acid addition salts thereof.

12. A member of the group consisting of 1-octyl-1-[2(5-hexyloxyindole-3-yl)-ethyl] guanidine and the pharmaceutically acceptable acid addition salts thereof.

13. A member of the group consisting of 1-phenyl-ethyl-1-[2(6-hexyloxyindole-3-yl)-ethyl] guanidine and the pharmaceutically acceptable acid addition salts thereof.

14. A member of the group consisting of 1-benzyl-1-[2(5-octyloxyindole-3-yl)-ethyl] guanidine and the pharmaceutically acceptable acid addition salts thereof.

15. 1 - {2 - (3,4 - dimethoxyphenyl)ethyl} - 1 - [2 - (5-benzyloxy-indole-3-yl)-ethyl] guanidine hydrochloride.

16. An indolylethylguanidine compound of the formula:

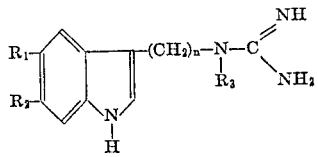

wherein $n$ is an integer of 1 to 2, $R_1$ and $R_2$ are each selected from the group consisting of hydrogen, hydroxy, alkyloxy of 1 to 5 carbon atoms, and in addition, benzyloxy when $n$ is 1, $R_3$ is alkyl of 1 to 5 carbon atoms, at least one of said groups designated by $R_1$ and $R_2$ being other than hydrogen and the pharmaceutically acceptable acid addition salts thereof.

17. A member selected from the group consisting of the compound of the formula:

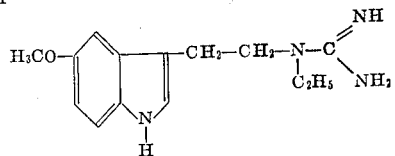

and the pharmaceutically acceptable acid addition salts thereof.

18. A member selected from the group consisting of the compound of the formula:

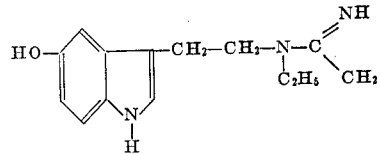

and the pharmaceutically acceptable acid addition salts thereof.

References Cited by the Examiner
UNITED STATES PATENTS

| | | | |
|---|---|---|---|
| 3,030,378 | 4/1962 | Mull | 260—313 |
| 3,093,632 | 6/1963 | Mull | 260—319 |

OTHER REFERENCES

Bielstein: vol. 22, II, page 348. Call No. QD 251–B4.

ALEX MAZEL, *Primary Examiner.*

M. O'BRIEN, *Assistant Examiner.*

CERTIFICATE OF CORRECTION

Patent No. 3,317,560 May 2, 1967

Volkert Claassen

It is hereby certified that error appears in the above numbered patent requiring correction and that the said Letters Patent should read as corrected below.

Column 3, lines 67 to 73, the formula should appear as shown below instead of as in the patent:

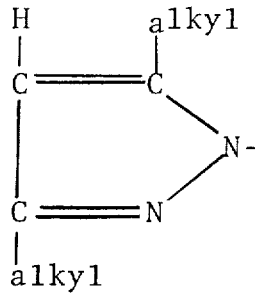

column 4, lines 3 to 8, the formula should appear as shown below instead of as in the patent:

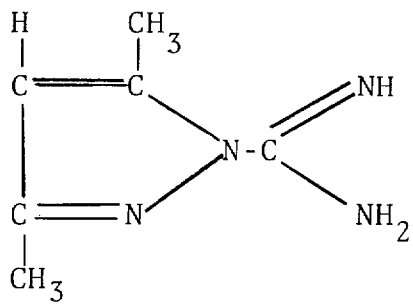

column 9, line 54, for "(e) in 500 ml. of" read -- d were added in --; column 14, line 69, for "3 alkoxy" read -- 2 alkoxy --.

Signed and sealed this 29th day of October 1968.

(SEAL)
Attest:

EDWARD M. FLETCHER, JR.
Attesting Officer

EDWARD J. BRENNER
Commissioner of Patents